US012683441B2

(12) United States Patent
Ertas et al.

(10) Patent No.: US 12,683,441 B2
(45) Date of Patent: Jul. 14, 2026

(54) AIRGAP COOLING SYSTEM FOR AN ELECTRIC MACHINE

(71) Applicants: General Electric Company, Schenectady, NY (US); General Electric Deutschland Holding GmbH, Frankfurt (DE); General Electric Company Polska Sp. z o.o., Warsaw (PL)

(72) Inventors: Bugra Han Ertas, Niskayuna, NY (US); Joseph John Zierer, Jr., Niskayuna, NY (US); Vandana Prabhakar Rallabandi, Niskayuna, NY (US); David Allan Torrey, Galway, NY (US); David William Crall, Loveland, OH (US); Mohamed Osama, Garching (DE); Adam Tomasz Pazinski, Warsaw (PL); Arthur William Sibbach, Boxford, MA (US)

(73) Assignees: General Electric Company, Schenectady, NY (US); General Electric Deutschland Holding GmbH, Frankfurt (DE); General Electric Company Polska Sp. z o.o., Warsaw (PL)

( * ) Notice: Subject to any disclaimer, the term of this patent is extended or adjusted under 35 U.S.C. 154(b) by 681 days.

(21) Appl. No.: 18/085,962

(22) Filed: Dec. 21, 2022

(65) Prior Publication Data

US 2023/0378827 A1      Nov. 23, 2023

(30) Foreign Application Priority Data

May 20, 2022    (PL) ......................................... 441233

(51) Int. Cl.
 *H02K 1/20*       (2006.01)
 *H02K 1/32*       (2006.01)
   (Continued)

(52) U.S. Cl.
 CPC ................. *H02K 1/20* (2013.01); *H02K 1/32* (2013.01); *H02K 5/203* (2021.01); *H02K 7/1823* (2013.01);
   (Continued)

(58) Field of Classification Search
 CPC .......... H02K 5/20; H02K 5/203; H02K 5/207; H02K 1/20
 See application file for complete search history.

(56) References Cited

U.S. PATENT DOCUMENTS 3,143,675 A      8/1964   Hauenstein
4,922,146 A      5/1990   Vanduyn
   (Continued)

FOREIGN PATENT DOCUMENTS

CN        108711964 A      10/2018
EP          2568576 A2 *    3/2013    ............. H02K 1/278

OTHER PUBLICATIONS

Koehring (EP2568576 A2) English Translation (Year: 2013).*

*Primary Examiner* — Tulsidas C Patel
*Assistant Examiner* — Robert E Mates
(74) *Attorney, Agent, or Firm* — Smith, Gambrell & Russell, LLP

(57) ABSTRACT

An airgap cooling system (140) for an electric machine (100), the electric machine (100) including a rotor assembly (102) rotatably mounted within a stator assembly (120) and defining an airgap (130) therebetween, wherein the stator assembly (120) comprises a lamination stack (124). The airgap cooling system (140) includes a plurality of distribution passages (142) that extend through the lamination stack
   (Continued)

(124); a plurality of discharge passages (150) that extend between the plurality of distribution passages (142) and the airgap (130); a cooling manifold (160) defining an annular distribution plenum (164) in fluid communication with the plurality of distribution passages (142), wherein the cooling manifold (160) is configured for receiving a cooling fluid (144) and directing the cooling fluid (144) into the distribution plenum (164), through the distribution passage (142) and the discharge passage (150), and into the airgap (130).

19 Claims, 7 Drawing Sheets

(51)  Int. Cl.

| | |
|---|---|
| *H02K 5/20* | (2006.01) |
| *H02K 7/18* | (2006.01) |
| *H02K 9/16* | (2006.01) |
| *H02K 9/197* | (2006.01) |
| *H02K 21/14* | (2006.01) |

(52)  U.S. Cl.
CPC ............... *H02K 9/16* (2013.01); *H02K 9/197* (2013.01); *H02K 21/14* (2013.01)

(56)  References Cited

U.S. PATENT DOCUMENTS

| | | | | |
|---|---|---|---|---|
| 6,201,323 | B1 * | 3/2001 | Semba | H02K 9/10 |
| | | | | 310/58 |
| 6,437,468 | B2 | 8/2002 | Stahl et al. | |
| 7,375,449 | B2 | 5/2008 | Butterfield | |
| 7,911,091 | B2 | 3/2011 | Takenaka et al. | |
| 8,760,015 | B2 | 6/2014 | Himmelmann | |
| 9,373,984 | B2 | 6/2016 | De Bock et al. | |
| 9,735,654 | B2 | 8/2017 | Stridsberg | |
| 2013/0076171 | A1 * | 3/2013 | Lepres | H02K 15/02 |
| | | | | 310/59 |
| 2021/0190395 | A1 | 6/2021 | Snell et al. | |
| 2021/0234436 | A1 | 7/2021 | Leisinger et al. | |
| 2022/0131428 | A1 | 4/2022 | Dieterich et al. | |

* cited by examiner

AIRGAP COOLING SYSTEM FOR AN ELECTRIC MACHINE

FEDERALLY SPONSORED RESEARCH

This invention was made with government support under contract number DE-FE00031617 awarded by the Department of Energy. The U.S. government has certain rights in the invention.

PRIORITY INFORMATION

The present application claims priority to Polish Patent Application Number P.441233 filed on May 20, 2022.

FIELD

The present disclosure relates to electric machines, and more particularly, to thermal energy management in electric machines.

BACKGROUND

Electric machines are used in a wide variety of settings, including industrial, commercial, and consumer applications. In any setting, an electric machine may generate a considerable amount of heat through a number of different pathways. For example, heat is typically generated in an electric machine through electric resistance in electric current flowing through a rotor and/or stator, hysteresis losses due to changing magnetic fields, and resistive heating due to the eddy currents generated by time-varying magnetic fields. Additionally, shearing of air/fluid within the airgap can generate significant heat and friction and an electric machine's moving components also typically generate heat, requiring lubrication.

The heat generated by an electric machine may contribute to inefficiencies, machine malfunctions, and failures if not properly managed. Notably, the amount of heat generated in the electric machine may be roughly proportional to the amount of power an electric machine generates (for generator application) or delivers (for power motor application). High performance applications require electric machines with a high power density, as the marketplace demands electric machines with larger power outputs and yet smaller machine sizes. The combination of larger power outputs and smaller machine sizes found in high power density electric machines gives rise to very demanding cooling requirements. Failure to remove this heat in high power density electric machines may result in materials exceeding their thermal operating limits, premature degradation of components, or failure of the electric machine altogether.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
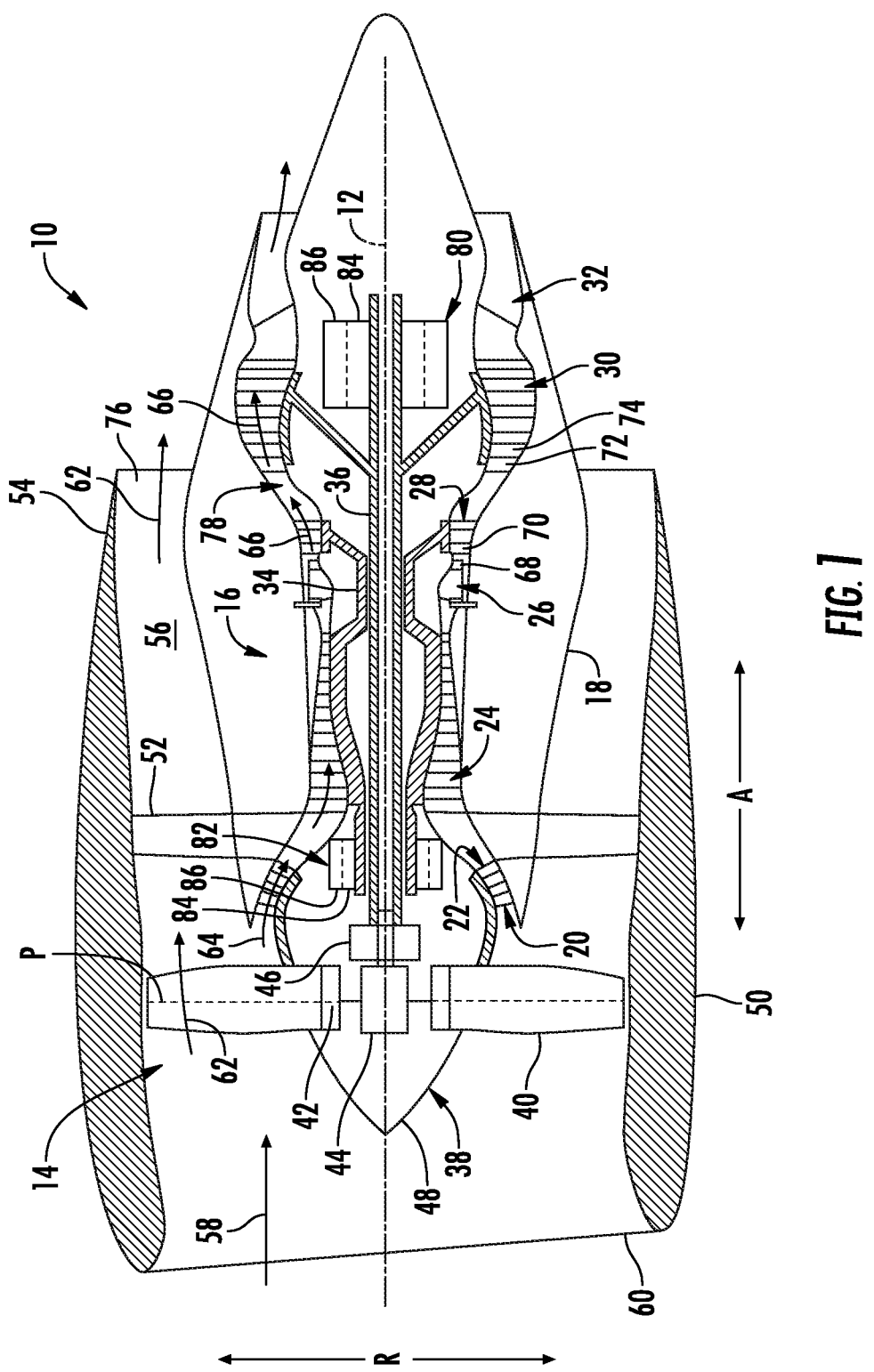
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally related to an electric machine with improved cooling. More specifically, a cooling system for a high power density electric machine that facilitates high speed operation while reducing thermal energy build-up and temperature non-uniformities would be particularly beneficial. These systems and methods may generally be directed to cooling a magnetic gap or airgap between a rotor and a stator armature of an electric machine, such as a permanent magnet electric machine (PM EM). In this regard, permanent magnet electric machines may utilize a layered rotor assembly that incorporates segmented magnets along the axial length and circumference of the rotor body. This assembly/construction method frequently results in the magnet array having insufficient "hoop" strength and therefore the magnets merely act as added masses and do not provide any hoop rigidity to the rotating assembly. Accordingly, rotor rotation will create a centrifugal force on individual magnet components and therefore a magnet retention feature/design element is needed.

Typically, a retaining ring is used to hold the rotor system together. In fact, retaining rings require some levels of radial preload on the rotor stack to ensure that no component "lift-off" at speed. Another aspect of PM EM rotor design is the magnetic gap, which is the radial clearance between the inner diameter of the retaining ring and the inner diameter of the stator armature. On the other hand, airgap may be used to refer to the physical radial clearance between the retaining ring and the stator inner diameter. This magnetic gap has a strong effect on the machine performance, specifically with respect to the machine power density. Therefore, carbon fiber retaining rings may be used due to their high stiffness to weight ratio, which yields a smaller magnetic gap compared to steel retaining rings. However, carbon fiber is temperature limited and needs to be cooled to operate at ultra-high speeds. Conventional methods of introducing cooling flow from the outside of the magnetic running gap may not be sufficient and would result in a thermal gradient across the length of the rotor.

Accordingly, aspects of the present subject matter implement direct cooling of the airgap using a new cooling circuit that is routed through the interdigitated armature laminations to a central slotted lamination (or to multiple slotted laminations) to deliver cooling flow to the rotating assembly retaining ring/sleeve. Cooling manifolds on both axial ends of the stator armature may be the first delivery cavities that the cooling gas enters. From these locations, there may be an array of axial cooling holes that run down the axial length of the armature routed to a central slotted lamination stack. This special lamination stack has radial slots in the lamination teeth that deliver the cooling gas from the axial holes to the airgap between the rotor surface and the stator armature inner diameter bore. The cooling flow then proceeds to exit the airgap on either axial end of the stator armature removing windage heat generated through high-speed operation. This approach can more effectively and efficiently use cooling fluids while generating a more uniform temperature across the rotor system.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) spool or shaft 34 drivingly connects the HP turbine 28 to the HP compressor 24. A low pressure (LP) spool or shaft 36 drivingly connects the LP turbine 30 to the LP compressor 22.

For the embodiment depicted in FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular outer nacelle or fan casing 50 that circumferentially surrounds the fan 38 and/or at least a portion of the core turbine engine 16. It should be appreciated that the fan casing 50 may be configured to be supported relative to the core turbine engine 16 by a plurality of circumferentially-spaced outlet guide vanes 52. Moreover, a downstream section 54 of the fan casing 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the fan casing 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the second portion of air 64 is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, which supports operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, which supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before the first portion of air 62 is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan engine 10 depicted in FIG. 1 is by way of example only and that in other exemplary embodiments, turbofan engine 10 may have any other suitable configuration. For example, it should be appreciated that in other exemplary embodiments, turbofan engine 10 may instead be configured as any other suitable turbine engine, such as a turboprop engine, turbojet engine, internal combustion engine, etc.

Additionally, the exemplary turbofan engine 10 depicted in FIG. 1 includes a first electric machine and a second electric machine. For the embodiment shown in the example of FIG. 1, the first electric machine is rotatable with the LP shaft 36 and fan 38, and the second electric machine is rotatable with the HP shaft 34. In such a manner, it will be appreciated that for the embodiment shown in FIG. 1, the first electric machine is an LP electric machine 80 and the second electric machine is an HP electric machine 82.

Specifically, for the embodiment depicted in FIG. 1, the LP electric machine 80 is configured as an electric generator co-axially mounted to and rotatable with the LP shaft 36. As used herein, "co-axially" refers to the axes being aligned. Moreover, for the embodiment shown in FIG. 1, the LP electric machine 80 is positioned inward of the hot gas path 78 within or aft of the turbine section of the turbofan engine 10, and as such may be referred to as an embedded electric machine. Similarly, for the embodiment depicted in FIG. 1, the HP electric machine 82 is configured as an electric generator co-axially mounted to and rotatable with the HP shaft 34. The HP electric machine 82 is also positioned inward of the hot gas path 78, but within compressor section of the turbofan engine 10, and as such may also be referred to as an embedded electric machine.

The LP electric machine 80 and the HP electric machine 82 each include a rotor assembly 84 and a stator assembly 86. The LP electric machine 80 and the HP electric machine 82 may be configured in accordance with one or more of the exemplary electric machines described below.

It should be appreciated, however, that in other embodiments, an axis of the LP electric machine 80 and/or the HP electric machine 82 may be offset radially from the axes of the LP shaft 36 and HP shaft 34, respectively, and further the LP electric machine 80 and/or the HP electric machine 82 may be oblique to the axes of the LP shaft 36 and HP shaft 34, respectively. Further, in one or more exemplary embodiments, the LP electric machine 80 and/or the HP electric machine 82 may be located outward of the hot gas path 78, e.g., within outer casing 18 of the turbofan engine 10 or fan casing 50. Moreover, it should be appreciated that in certain exemplary embodiments, one or both of the LP electric machine 80 and the HP electric machine 82 may be configured as an electric generator, an electric motor, or may be switched between an electric generator mode and an electric motor mode.

Referring now generally to FIGS. 2 through 9, an electric machine 100 will be described according to exemplary embodiments of the present subject matter. According to exemplary embodiments, electric machine 100 may be used with turbofan engine 10, e.g., as LP electric machine 80 and/or the HP electric machine 82. According to still other embodiments, electric machine 100 may be used in any other suitable system as an electric motor, an electric generator, or any other suitable electric machine. It should be appreciated that electric machine 100 may vary while remaining within the scope of the present subject matter.

As illustrated, electric machine 100 may generally define an axial direction A, a radial direction R perpendicular to axial direction A, and a circumferential direction C that extends around axial direction A. Notably, according to an exemplary embodiment, these directions may correspond to the same or similar directions to those described above with respect to turbofan engine 10, e.g., when used as LP electric machine 80 or HP electric machine 82 in such an application. Accordingly, like reference characters may be used to refer to the axial direction A, the radial direction R, and the circumferential direction C, though it should be appreciated that this directional reference frame may vary in different applications.

In general, electric machine 100 includes a rotor assembly 102 that is mechanically coupled to a shaft 104. For example, according to an exemplary embodiment, shaft 104 of electric machine 100 may be mechanically coupled to a shaft of a gas turbine engine, such as HP shaft 34 or LP shaft 36 of turbofan engine 10. In this manner, electric machine 100 may be used to generate useful electricity for auxiliary purposes within a gas turbine engine or aircraft subsystems, or for any other auxiliary purpose. Alternatively, electric machine 100 may be used to convert electric power into mechanical power as required by an operating mode of turbofan 10. According to an exemplary embodiment, rotor assembly 102 may generally be configured for rotating about the axial direction A, e.g., which may correspond to the axial direction A as described above with respect to turbofan engine 10 when electric machine 100 is installed on turbofan engine 10.

Figure 5:
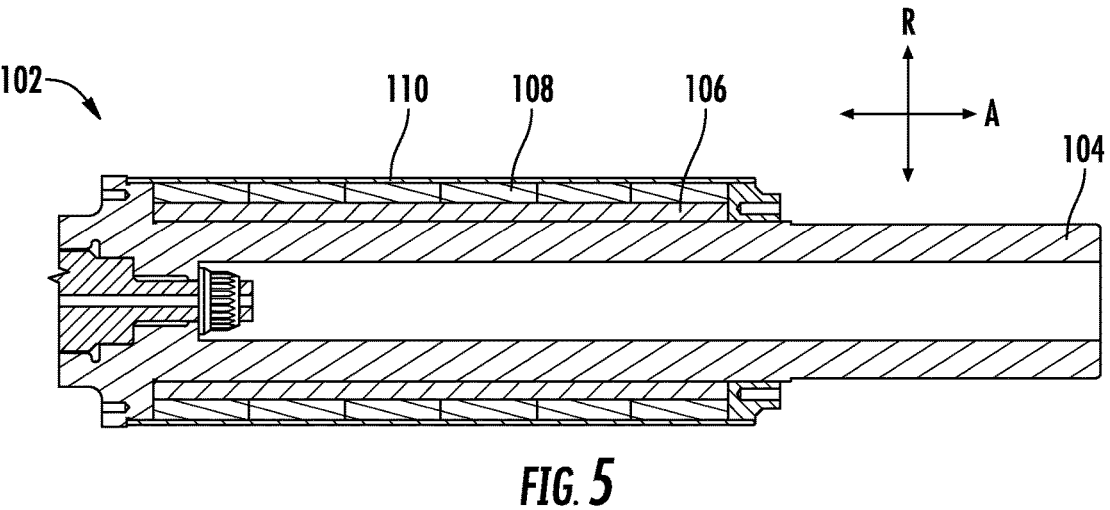
FIG. 5 is a cross-sectional view of a rotor assembly of the exemplary electric machine of FIG. 2 in accordance with an exemplary aspect of the present disclosure.

As best shown in the illustrated embodiment of FIG. 5, rotor assembly 102 may generally include a rotor lamination stack 106, a plurality of rotor magnets 108, and a retaining ring 110. For example, rotor magnets 108 may include rare earth permanent magnets (e.g., such that electric machine 100 is a permanent magnet electric machine) and retaining ring 110 may generally wrap around the array of rotor magnets 108, e.g., to prevent "lift off" of rotor magnets 108 during high-speed operation of electric machine 100. Retaining ring 110 may be formed from any suitably rigid material, such as a metal alloy or a carbon fiber composite material.

Referring again to FIG. 2, electric machine 100 may further include a stator assembly 120 that surrounds rotor assembly 102. In general, stator assembly 120 is configured for generating a torque to drive rotor assembly 102 (e.g., when electric machine 100 is operating in a motoring mode) or to generate electricity (e.g., when electric machine 100 is operating in a generator mode) when a rotor assembly 102 is rotating to generate a rotating magnetic field, as is understood to one of ordinary skill in the art.

Figure 2:
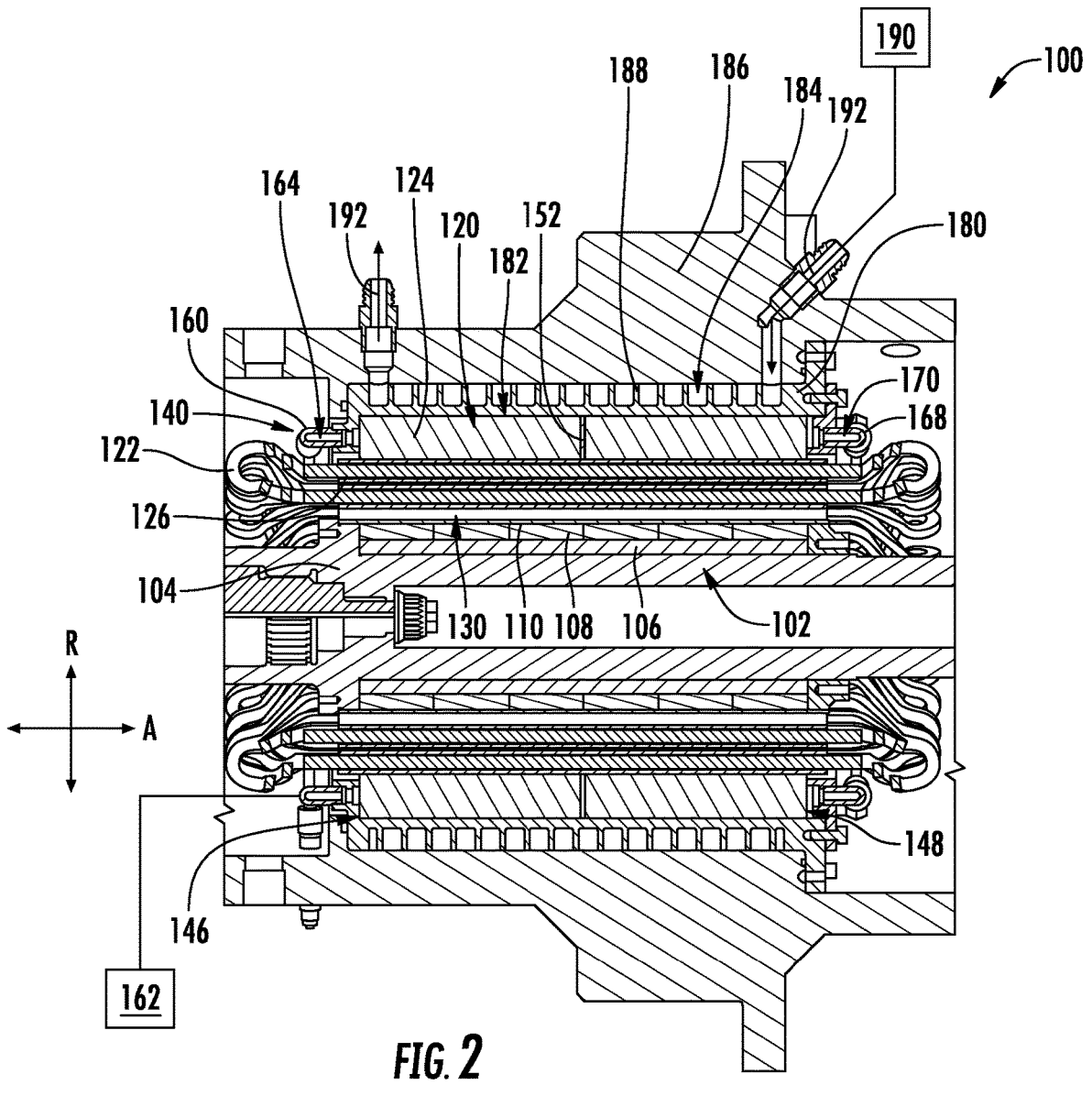
FIG. 2 is a cross-sectional view of an electric machine in accordance with an exemplary aspect of the present disclosure.
Figures 3, 4:
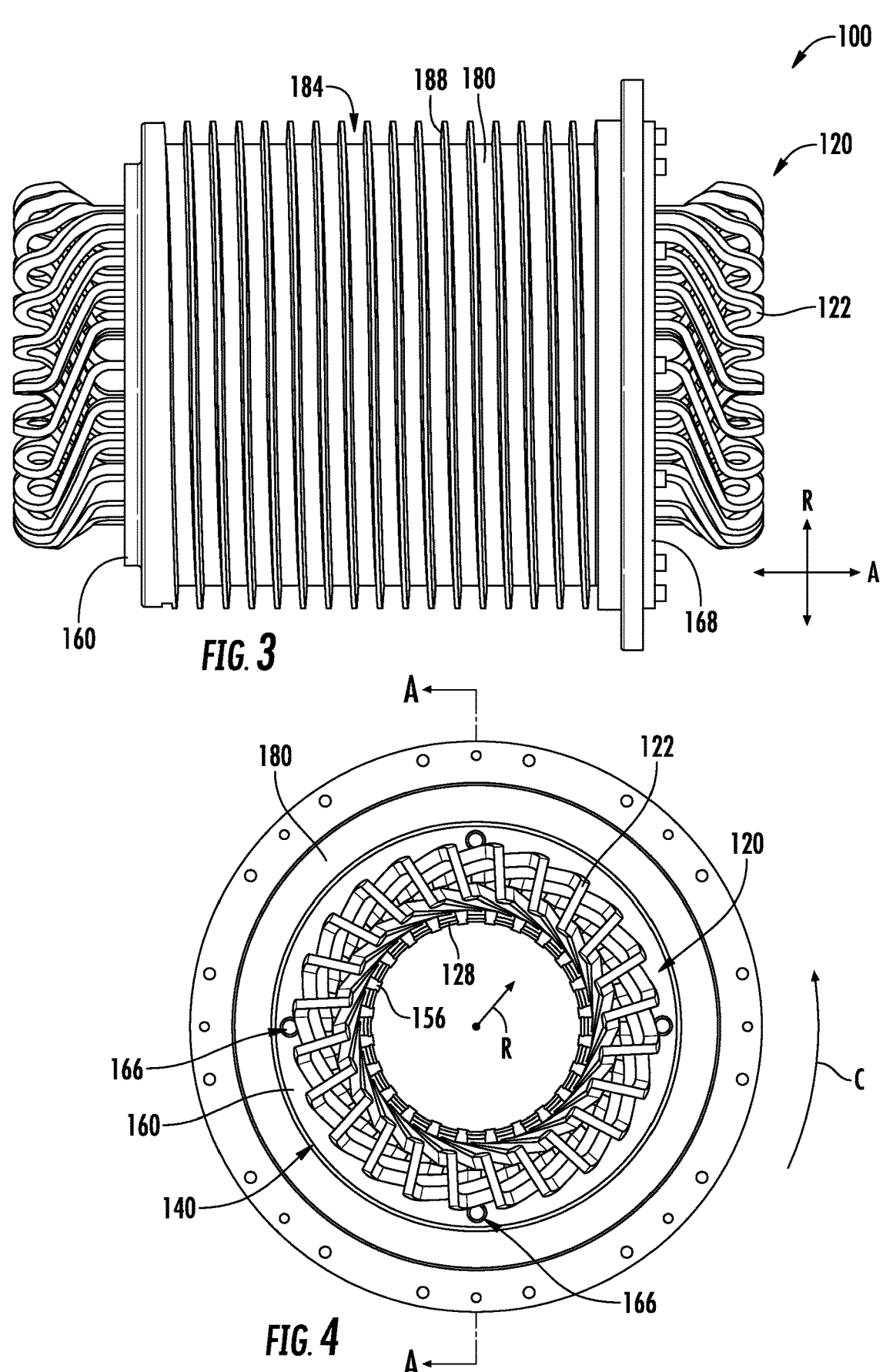
FIG. 3 is a side, perspective view of the exemplary electric machine of FIG. 2 with a rotor assembly removed in accordance with an exemplary aspect of the present disclosure.
FIG. 4 is an end, perspective view of the exemplary electric machine of FIG. 2 with a rotor assembly removed in accordance with an exemplary aspect of the present disclosure.

Specifically, according to the illustrated embodiment of FIG. 2, stator assembly 120 includes conductive windings 122 (e.g., copper windings) and that are positioned within a lamination stack 124. Stator assembly 120 may further include insulation 126 positioned between the conductive windings 122 and the lamination stack 124 and other features for retaining the conductive windings 122 within the lamination stack 124, e.g., such as retention wedges 128. It should be appreciated that both rotor assembly 102 and stator assembly 120 may include alternative or additional features or components while remaining within the scope of the present subject matter.

According to the illustrated embodiment of FIG. 2, stator assembly 120 is positioned around and spaced apart from the rotor assembly 102 to define an airgap 130 between the rotor assembly 102 and the stator assembly 120. In this regard, airgap 130 may be an annular void that completely surrounds rotor assembly 102 and extends along the axial direction A. Notably, this airgap 130 has a strong effect on the performance of electric machine 100, particularly with respect to power density. For example, it may be desirable to maintain a very small airgap 130 for improved power density. Notably, as explained above, airgap 130 may experience very high temperatures and failure to regulate or reduce these temperatures may result in operability issues of electric machine 100. For example, if the temperature within airgap 130 is too high (e.g., the temperature exceeds a material integrity threshold temperature), the mechanical strength of retaining ring 110 may be compromised, thereby permitting the rotor magnets 108 to lift off under the centrifugal force generated during high-speed operation of rotor assembly 102. This lift off may compromise the size of the airgap, may result in rubbing between the rotor assembly 102 and stator assembly 120, or may result in complete machine failure. Also, if the temperature within airgap 130 is too high (e.g., the temperature exceeds a material integrity threshold temperature), the magnetic strength of magnet array 108 may be reduced limiting the performance of electric machine 100. Accordingly, aspects of the present subject matter are generally directed to systems for cooling airgap 130 to prevent these issues.

It should be appreciated that the material integrity threshold temperature may be determined in any suitable manner. For example, the material integrity threshold temperature may be a predetermined temperature above which the strength of the material decreases by a certain percentage. In this regard, the material integrity threshold temperature may be 100° F., 150° F., 200° F., 300° F., 500° F., or higher. Alternatively, the material integrity threshold temperature may be related to the atmospheric temperature where electric machine 100 is operating. In this regard, the material integrity threshold temperature may be equal to 2 times, 5 times, 10 times, 20 times, or 50 times, the atmospheric temperature where electric machine 100 is operating. Other suitable material integrity threshold temperatures are possible and within the scope of the present subject matter.

Figure 6:
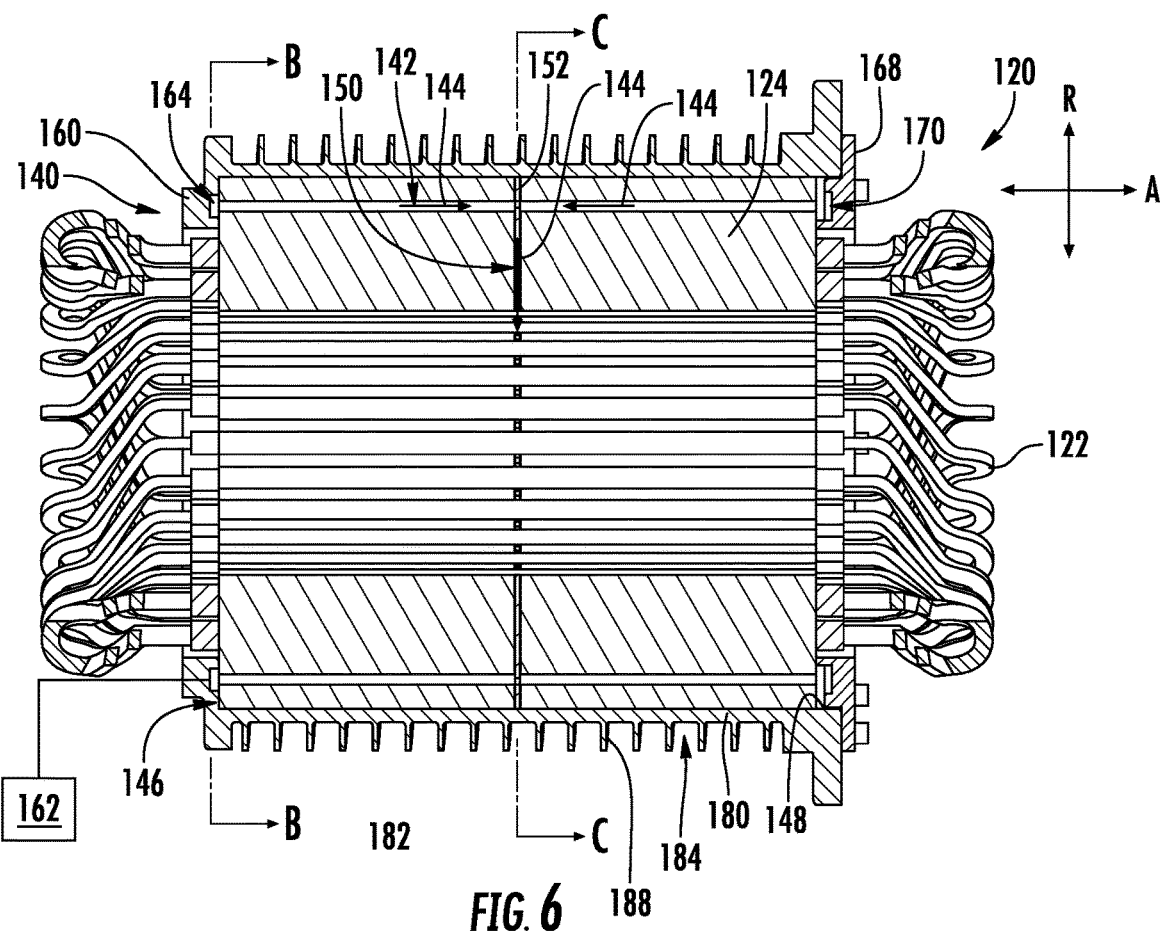
FIG. 6 is a cross-sectional view of a stator assembly of the exemplary electric machine of FIG. 2 taken along Line A-A from FIG. 4 in accordance with an exemplary aspect of the present disclosure.
Figure 7:
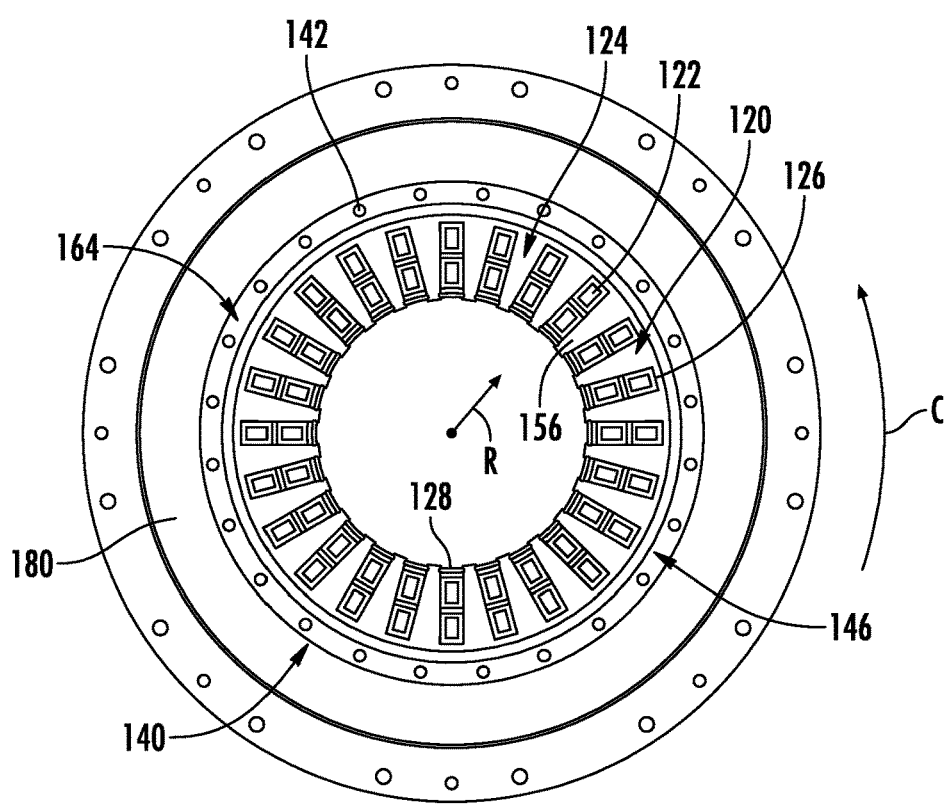
FIG. 7 is a cross-sectional view of the exemplary stator assembly of FIG. 6 taken along Line B-B in accordance with an exemplary aspect of the present disclosure.
Figure 8:
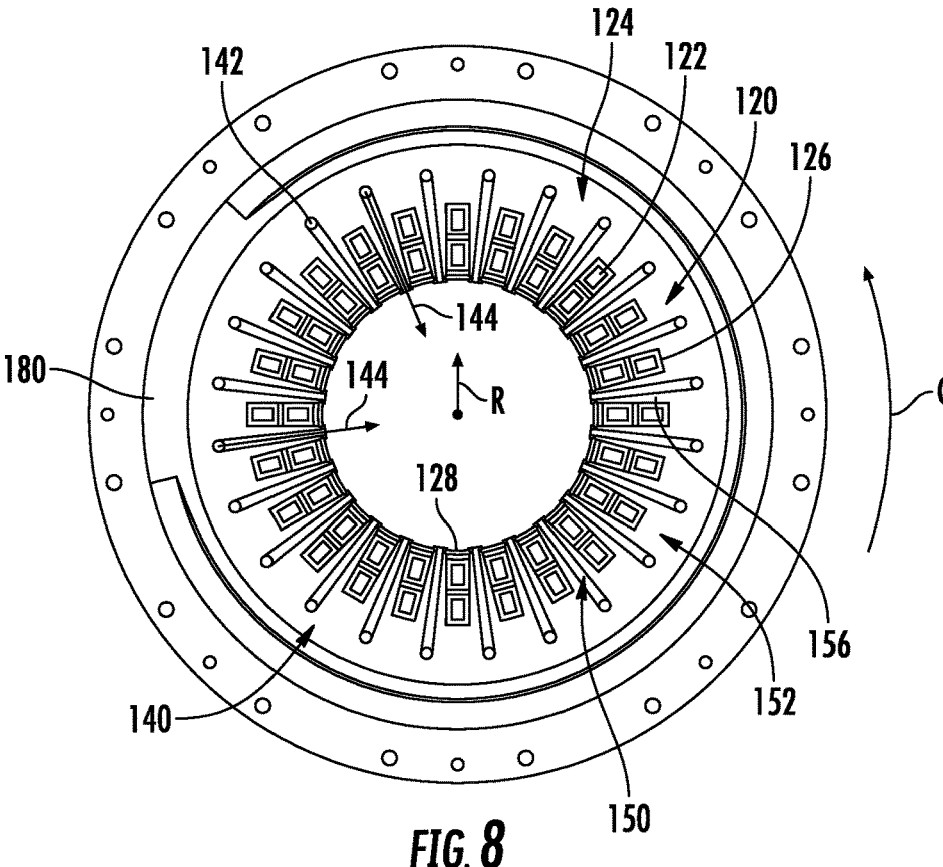
FIG. 8 is a cross-sectional view of the exemplary stator assembly of FIG. 6 taken along Line C-C in accordance with an exemplary aspect of the present disclosure.

Specifically, referring still generally to FIGS. 2 through 9, electric machine 100 may include an airgap cooling system 140 which is generally configured for reducing the temperature within airgap 130 and/or otherwise reducing temperature nonuniformities within electric machine 100. Specifically, as best shown in FIG. 6, a distribution passage 142 may be defined through the lamination stack 124 for receiving a flow of cooling fluid 144, as described in more detail below. Specifically, according to the illustrated embodiment, lamination stack 124 may define a first axial end face 146 and a second axial end face 148 at opposite ends of lamination stack 124 along the axial direction A.

Notably, according to the illustrated embodiment of FIG. 6, distribution passage 142 may generally extend parallel to the axial direction A from the first axial end face 146 to second axial end face 148, e.g., to receive the flow of cooling fluid 144 from both ends. However, it should be appreciated that according to an alternative embodiment, distribution passage 142 may be fluidly coupled to only one of the axial end faces 146, 148 and/or distribution passage 142 may extend only partially through an axial length of lamination stack 124. In addition, it should be appreciated that according to alternative embodiments, distribution passage 142 may extend in a non-axial direction, maybe serpentine, may extend along the circumferential direction C, or may otherwise vary in size, geometry, and configuration while remaining within the scope of the present subject matter.

Referring still to FIG. 6, lamination stack 124 may further define a discharge passage 150 that extends from distribution passage 142 inward along the radial direction R to airgap 130. Specifically, discharge passage 150 may be fluidly coupled to distribution passage 142. In this regard, the flow of cooling fluid 144 passing through distribution passage 142 may be directed through discharge passage 150 into airgap 130, e.g., to facilitate airgap cooling and improve temperature uniformity within the rotor assembly 102 and stator assembly 120.

Notably, FIG. 6 illustrates a single distribution passage 142 and a single discharge passage 150 in order to facilitate discussion of aspects of the present subject matter. However, it should be appreciated that stator assembly 120 may include a plurality of distribution passages 142 and/or discharge passages 150 configured, positioned, and oriented in any suitable manner to facilitate targeted cooling of any particular region within airgap 130. For example, referring now specifically to FIGS. 7 and 8, stator assembly 120 is illustrated as having a plurality of distribution passages 142 that are spaced apart about the circumferential direction C. In addition, stator assembly 120 includes a plurality of discharge passages 150, wherein each of the plurality of discharge passages 150 may be fluidly coupled to one of the plurality of distribution passages 142.

Similarly, although a single discharge passage 150 is illustrated herein, it should be appreciated that stator assembly 120 may define a plurality of discharge passages that are spaced apart along the axial direction A and which are each fluidly coupled to a distribution passage 142. In this regard, discharge passages 150 are illustrated as being positioned within a central slotted lamination 152 of lamination stack 124. Central slotted lamination 152 is positioned in the center or middle of lamination stack 124 along the axial direction A. In this manner, the flow of cooling fluid 144 may be provided to the middle of airgap 130 before it is distributed outward along the axial direction A to facilitate cooling of airgap 130. However, any suitable number of slotted limitations may be positioned within lamination stack 124 at any suitable axial position for improved flow distribution. In addition, it should be appreciated that the size and geometry of discharge passages 150 that are defined within each of these slotted laminations may vary while remaining within the scope of the present subject matter.

Figure 9:
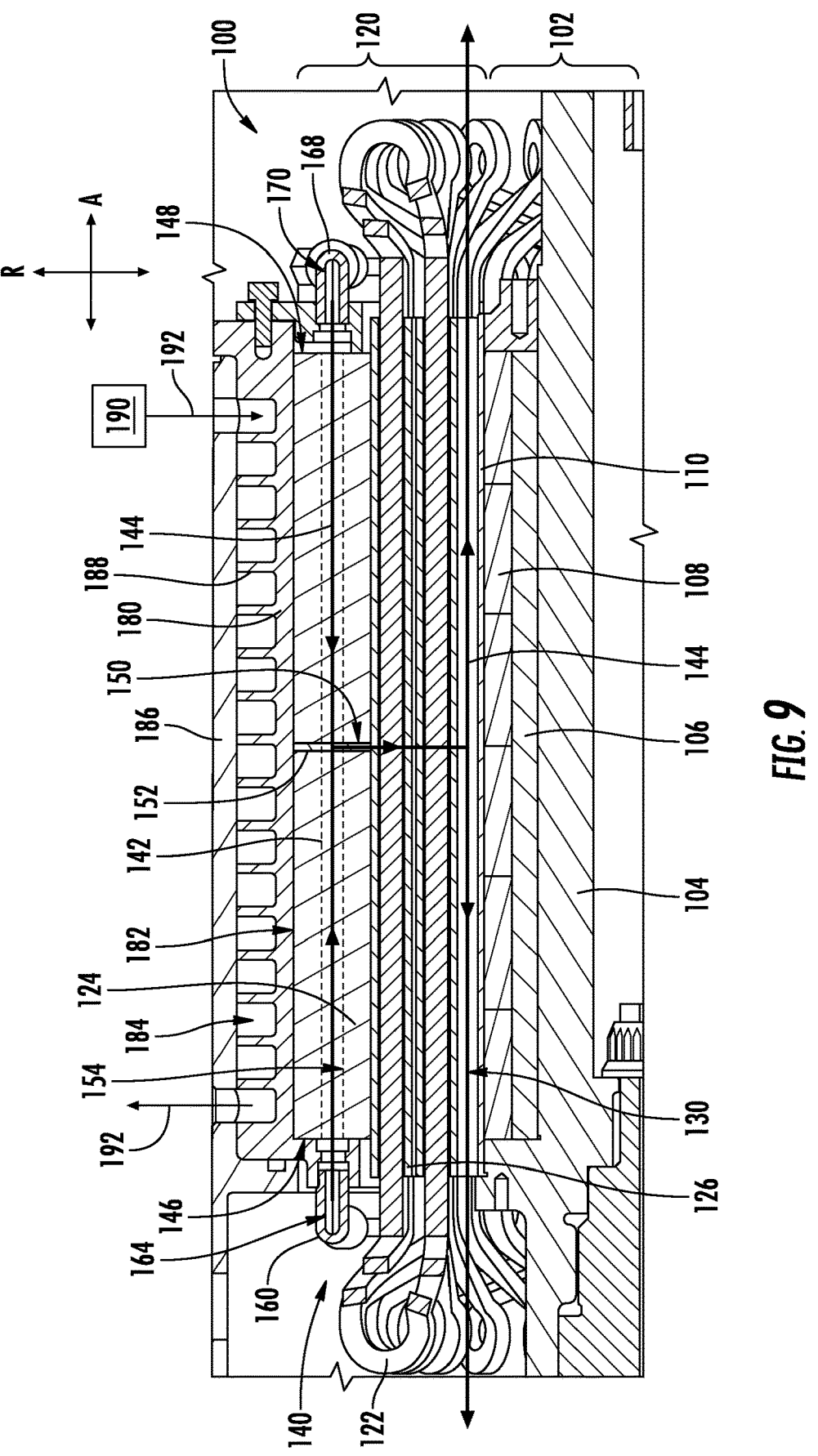
FIG. 9 is a close-up, cross-sectional view of the exemplary electric machine of FIG. 2 in accordance with an exemplary aspect of the present disclosure.
Figure 10:
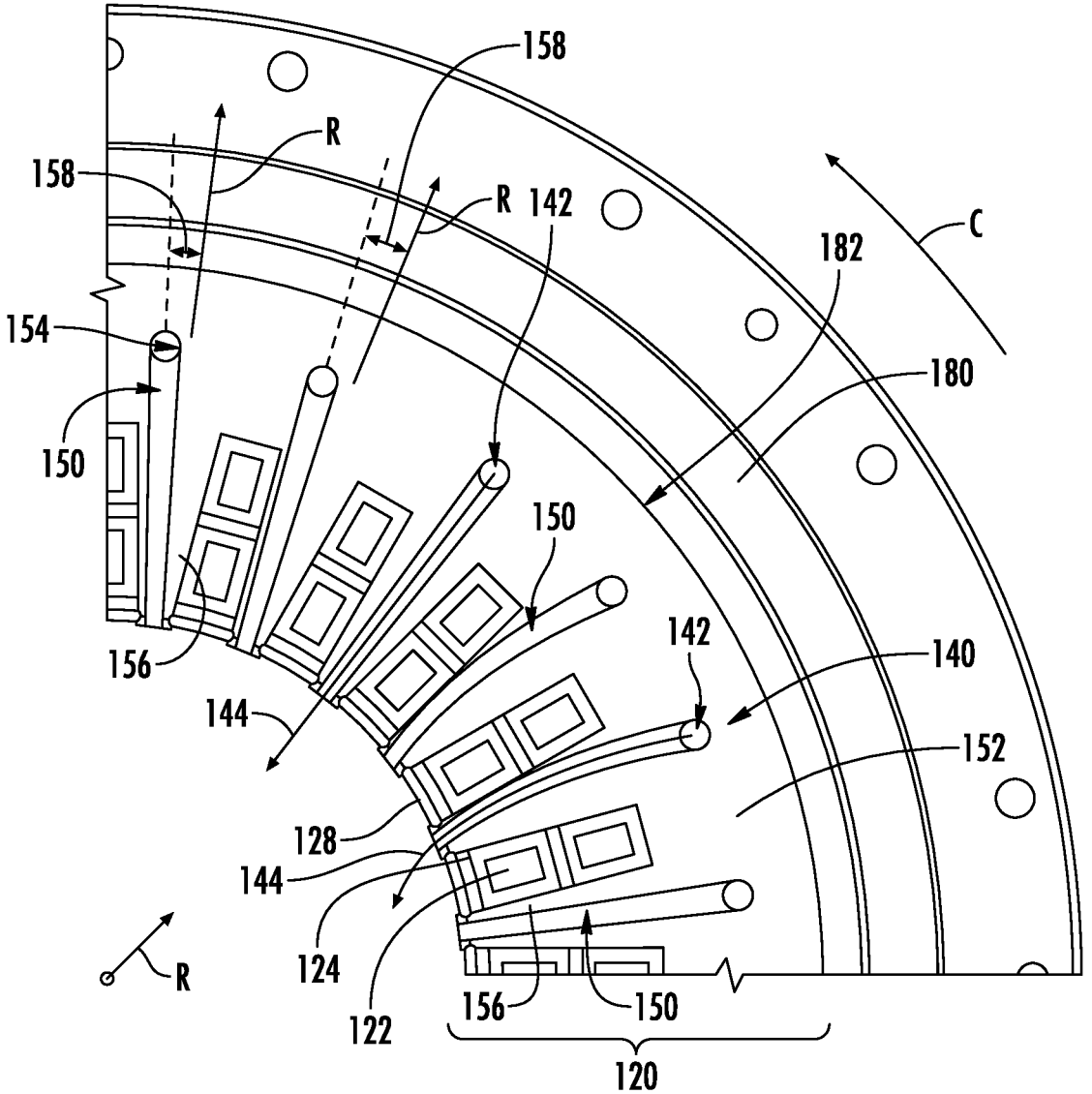
FIG. 10 is a close-up, cross-sectional view of an exemplary stator assembly in accordance with an exemplary aspect of the present disclosure.

Referring now briefly to FIGS. 9 and 10, lamination stack 124 may include a thermal insulation layer 154 positioned within or surrounding distribution passages 142 and/or discharge passages 150 for insulating lamination stack 124 from the flow of cooling fluid 144. In this regard, for example, thermal insulation layer 154 may include any suitable sleeve, sheath, coating, or other material positioned within lamination stack 124 to reduce heat transfer from lamination stack 124 into the flow of cooling fluid 144 passing through distribution passages 142 and/or discharge passages 150. In this manner, the flow of cooling fluid 144 that is discharged into airgap 130 may have lower potential temperature and greater cooling effect.

Referring now specifically to FIG. 10, a close-up view of the central slotted lamination 152 and discharge passages 150 will be described according to exemplary embodiments of the present subject matter. Specifically, according to the illustrated embodiment, central slotted lamination 152 may generally define a plurality of circumferentially spaced lamination teeth 156. Conductive windings 122 and insulation 126 may be secured by a retention wedge 128 within the space between adjacent lamination teeth 156. According to the embodiment illustrated in FIGS. 7 and 8, discharge passages 150 extend parallel to the radial direction R through a center of each lamination tooth 156. In this manner, the flow of cooling fluid 144 is injected into airgap 130 substantially along the radial direction R. This type of flow injection may be particularly suitable for electric machines that are configured for bidirectional operation.

However, it should be appreciated that according to alternative embodiments, discharge passages 150 may have different geometries and configurations to facilitate a different discharge profile of the flow of cooling fluid 144 into airgap 130. In this regard, as illustrated for example in FIG. 10, one or more discharge passages 150 may be oriented at an angle 158 relative to the radial direction R. In addition, or alternatively, one or more discharge passages 150 may be curvilinear (e.g., see FIG. 10). In this manner, the flow of cooling fluid 144 may be discharged into airgap 130 at an angle relative to the radial direction R and/or with a pre-swirl that may counteract or flow against the natural direction of airflow within airgap 130. Other variations to discharge passages 150 may be made while remaining within the scope of the present subject matter, e.g., discharge passages may be straight, curved, serpentine, arcuate, or any other suitable geometry or combination therebetween.

Referring generally to FIGS. 2, 6, and 9, airgap cooling system 140 may further include a cooling manifold 160 that is positioned at a first axial end face 146 of lamination stack 124 and which is fluidly coupled to distribution passages 142 to provide the flow of cooling fluid 144 therethrough. In addition, airgap cooling system 140 may include a cooling fluid supply 162 that is fluidly coupled to cooling manifold 160 for selectively urging or directing the flow of cooling fluid 144 into distribution passages 142, e.g., to facilitate cooling of airgap 130. Although an exemplary cooling manifold 160 and cooling fluid supply 162 are described below according to exemplary embodiments, it should be appreciated that any suitable source of cooling fluid may be used and any suitable means for supplying that cooling fluid to distribution passages 142 may be used according to alternative embodiments.

Specifically, according to the illustrated embodiment, cooling manifold 160 generally defines a distribution plenum 164 that is in fluid communication with each distribution passage 142. For example, distribution plenum 164 may be an annular distribution plenum 164 that extends around first axial end face 146 of lamination stack 124 to define an annular passage for supplying all distribution passages 142 simultaneously. Cooling fluid supply 162 may be fluidly coupled to distribution plenum 164 at one circumferential position or at multiple circumferential positions. For example, referring briefly to FIG. 4, cooling manifold 160 defines four inlet ports 166 that may be fluidly coupled to cooling fluid supply 162 to facilitate fluid communication with distribution plenum 164. The flow of cooling fluid 144 supplied from cooling fluid supply 162 may be distributed about distribution plenum 164, injected into distribution passages 142, pass through discharge passages 150, and discharge into airgap 130.

In addition, according to an exemplary embodiment, airgap cooling system 140 may further include an auxiliary cooling manifold 168 that is positioned and secured against second axial end face 148 of lamination stack 124. Similar to cooling manifold 160, auxiliary cooling manifold 168 may define an auxiliary distribution plenum 170 that is in fluid communication with distribution passages 142 from second axial end face 148. In addition, auxiliary cooling manifold 168 may be fluidly coupled to cooling fluid supply 162 such that the flow of cooling fluid 144 may pass through distribution plenum 164, 170 and into distribution passages 142 from both ends of lamination stack 124.

Notably, cooling fluid supply 162 may generally obtain the flow of cooling fluid 144 from any suitable location or source. For example, when electric machine 100 is used in application with turbofan engine 10, the flow of cooling fluid 144 may be from a compressor bleed source or port of a turbofan engine 10. In this regard, for example, bleed air may be obtained from LP compressor 22 or HP compressor 24 and passed directly into airgap cooling system 140. According to still other embodiments, the flow of cooling fluid 144 may include at least one of air, supercritical carbon dioxide, supercritical hydrogen, other supercritical liquids, or any other suitable cooling fluid.

Notably, electric machine 100 may include additional cooling systems for improved safety and performance of electric machine 100. For example, referring now briefly to FIGS. 3 and 9, electric machine 100 may further include a cooling jacket 180 that is positioned around an outer radial surface 182 of stator assembly 120. A cooling channel 184 may be defined between cooling jacket 180 and an outer casing 186 of electric machine 100. More specifically, cooling jacket 180 may define one or more radial fins 188 that extend towards outer casing 186 along the radial direction R to define cooling channel 184. For example, cooling channel 184 may be defined such that it is helical about the axial direction A. A secondary cooling fluid supply 190 may be in fluid communication with cooling channel 184 for providing a flow of secondary cooling fluid 192 through cooling jacket 180. The flow of secondary cooling fluid 192 may be from any suitable source and is generally configured for cooling electric machine 100 from the outer radial surface 182 of stator assembly 120.

Notably, according to the illustrated embodiment of FIG. 9, cooling manifold 160 may be formed at least in part by cooling jacket 180. In this regard, cooling jacket 180 may wrap around first axial end face 146 and may at least partially define cooling manifold 160 and/or distribution plenum 164. In addition, auxiliary cooling manifold 168 may be mechanically coupled to cooling jacket 180 at a second axial end face 148, e.g., to secure lamination stack 124 within stator assembly 120 and to provide the flow of cooling fluid 144 from both axial end faces 146, 148. It should be appreciated that other cooling configurations are possible and within the scope of the present subject matter.

As explained briefly above, the airgap cooling system 140 described herein facilitates improved cooling of an electric machine, facilitates higher speed operation with reduced thermal energy build-up, and improves temperature uniformity during operation of the electric machine. This airgap cooling system 140 can more effectively and efficiently use cooling fluids while generating a more uniform temperature across the rotor system.

Further aspects are provided by the subject matter of the following clauses:

An electric machine defining an axial direction, a radial direction, and a circumferential direction, the electric machine comprising: a shaft rotating about the axial direction; a rotor assembly mechanically coupled to the shaft; a stator assembly surrounding the rotor assembly and being spaced apart from the rotor assembly along the radial direction to define an airgap therebetween, the stator assembly further comprising a lamination stack defining a distribution passage that extends through the lamination stack from an axial end face of the lamination stack, the lamination stack further defining a discharge passage that extends between the distribution passage and the airgap; a cooling manifold positioned at the axial end face of the lamination stack and defining a distribution plenum in fluid communication with the distribution passage; and a cooling fluid supply fluidly coupled to the cooling manifold for selectively directing a cooling fluid into the distribution plenum, through the distribution passage and the discharge passage, and into the airgap.

The electric machine of any preceding clause, wherein the axial end face is a first axial end face and the distribution passage extends through the lamination stack to a second axial end face, and wherein the electric machine further comprises: an auxiliary cooling manifold positioned at the second axial end face of the lamination stack and defining an auxiliary distribution plenum in fluid communication with the distribution passage.

The electric machine of any preceding clause, wherein the distribution passage extends through the lamination stack parallel to the axial direction.

The electric machine of any preceding clause, wherein the stator assembly defines: a plurality of distribution passages that are spaced apart about the circumferential direction, wherein the distribution plenum is an annular distribution plenum fluidly coupled to each of the plurality of distribution passages at the axial end face of the lamination stack; and a plurality of discharge passages, each of the plurality of discharge passages being fluidly coupled to one of the plurality of distribution passages.

The electric machine of any preceding clause, wherein the stator assembly defines a plurality of discharges passages spaced apart along the axial direction, each of the plurality of discharge passages being fluidly coupled to the distribution passage.

The electric machine of any preceding clause, wherein the discharge passage is defined through a lamination tooth of the lamination stack.

The electric machine of any preceding clause, wherein the discharge passage extends parallel to the radial direction between the distribution passage and the airgap.

The electric machine of any preceding clause, wherein the discharge passage is angled relative to the radial direction.

The electric machine of any preceding clause, wherein the discharge passage is curvilinear.

The electric machine of any preceding clause, wherein the lamination stack further comprises a thermal insulation layer surrounding at least one of the distribution passage or the discharge passage.

The electric machine of any preceding clause, wherein the cooling fluid supply comprises a compressor bleed source of a gas turbine engine.

The electric machine of any preceding clause, wherein the cooling fluid comprises at least one of air, supercritical carbon dioxide, or supercritical hydrogen.

The electric machine of any preceding clause, further comprising: a cooling jacket positioned around an outer radial surface of the stator assembly and defining a cooling channel; and a secondary cooling fluid supply in fluid communication with the cooling channel of the cooling jacket to provide a secondary cooling fluid through the cooling jacket.

The electric machine of any preceding clause, wherein the cooling channel of the cooling jacket is helical about the axial direction.

The electric machine of any preceding clause, wherein the cooling manifold is formed at least in part by the cooling jacket.

The electric machine of any preceding clause, wherein the electric machine is a permanent magnet electric machine.

The electric machine of any preceding clause, wherein the electric machine is mechanically coupled to a high pressure shaft or a low pressure shaft of a gas turbine engine.

An airgap cooling system for an electric machine, the electric machine comprising a rotor assembly rotatably mounted within a stator assembly and defining an airgap therebetween, wherein the stator assembly comprises a lamination stack, the airgap cooling system comprising: a plurality of distribution passages that extend through the lamination stack from an axial end face of the lamination stack; a plurality of discharge passages that extend between the plurality of distribution passages and the airgap; a cooling manifold positioned at an axial end face of the lamination stack and defining an annular distribution plenum in fluid communication with the plurality of distribution passages; and a cooling fluid supply fluidly coupled to the cooling manifold for selectively directing a cooling fluid into the annular distribution plenum, through the plurality of distribution passages and the plurality of discharge passages, and into the airgap.

The airgap cooling system of any preceding clause, wherein the axial end face is a first axial end face and the plurality of distribution passages extend through the lamination stack to a second axial end face of the lamination stack, the airgap cooling system further comprising: an auxiliary cooling manifold positioned at the second axial end face of the lamination stack and defining an auxiliary annular distribution plenum in fluid communication with the plurality of distribution passages.

The airgap cooling system of any preceding clause, wherein the plurality of distribution passages extends through the lamination stack parallel to an axial direction and the plurality of discharge passages extend parallel to a radial direction.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An electric machine defining an axial direction, a radial direction, and a circumferential direction, the electric machine comprising:
   a shaft rotating about the axial direction;
   a rotor assembly mechanically coupled to the shaft;
   a stator assembly surrounding the rotor assembly and being spaced apart from the rotor assembly along the radial direction to define an airgap therebetween, the stator assembly further comprising a lamination stack defining a distribution passage that extends through the lamination stack from an axial end face of the lamination stack, the lamination stack further defining a discharge passage that extends between the distribution passage and the airgap; and
   a cooling manifold positioned at the axial end face of the lamination stack and defining a distribution plenum in fluid communication with the distribution passage, wherein the cooling manifold is configured for receiving a cooling fluid and directing the cooling fluid into the distribution plenum, through the distribution passage and the discharge passage, and into the airgap,
   wherein the cooling manifold is configured for receiving the cooling fluid from a cooling fluid supply that is fluidly coupled to the cooling manifold, wherein the cooling fluid supply comprises a compressor bleed source of a gas turbine engine.

2. The electric machine of claim 1, wherein the axial end face is a first axial end face and the distribution passage extends through the lamination stack to a second axial end face, and wherein the electric machine further comprises:
   an auxiliary cooling manifold positioned at the second axial end face of the lamination stack and defining an auxiliary distribution plenum in fluid communication with the distribution passage.

3. The electric machine of claim 1, wherein the distribution passage extends through the lamination stack parallel to the axial direction.

4. The electric machine of claim 1, wherein the stator assembly defines:

a plurality of distribution passages that are spaced apart about the circumferential direction, wherein the distribution plenum is an annular distribution plenum fluidly coupled to each of the plurality of distribution passages at the axial end face of the lamination stack; and
a plurality of discharge passages, each of the plurality of discharge passages being fluidly coupled to one of the plurality of distribution passages.

5. The electric machine of claim 1, wherein the stator assembly defines a plurality of discharges passages spaced apart along the axial direction, each of the plurality of discharge passages being fluidly coupled to the distribution passage.

6. The electric machine of claim 1, wherein the discharge passage is defined through a lamination tooth of the lamination stack.

7. The electric machine of claim 1, wherein the discharge passage extends parallel to the radial direction between the distribution passage and the airgap.

8. The electric machine of claim 1, wherein the lamination stack further comprises a thermal insulation layer surrounding at least one of the distribution passage or the discharge passage.

9. The electric machine of claim 1, wherein the cooling fluid comprises at least one of air, supercritical carbon dioxide, or supercritical hydrogen.

10. The electric machine of claim 1, further comprising:
    a cooling jacket positioned around an outer radial surface of the stator assembly and defining a cooling channel; and
    a secondary cooling fluid supply in fluid communication with the cooling channel of the cooling jacket to provide a secondary cooling fluid through the cooling jacket.

11. The electric machine of claim 10, wherein the cooling channel of the cooling jacket is helical about the axial direction.

12. The electric machine of claim 1, wherein the electric machine is a permanent magnet electric machine.

13. The electric machine of claim 1, wherein the electric machine is mechanically coupled to a high pressure shaft or a low pressure shaft of a gas turbine engine.

14. An electric machine defining an axial direction, a radial direction, and a circumferential direction, the electric machine comprising:
    a shaft rotating about the axial direction;
    a rotor assembly mechanically coupled to the shaft;
    a stator assembly surrounding the rotor assembly and being spaced apart from the rotor assembly along the radial direction to define an airgap therebetween, the stator assembly further comprising a lamination stack defining a distribution passage that extends through the lamination stack from an axial end face of the lamination stack, the lamination stack further defining a discharge passage that extends between the distribution passage and the airgap; and
    a cooling manifold positioned at the axial end face of the lamination stack and defining a distribution plenum in fluid communication with the distribution passage, wherein the cooling manifold is configured for receiving a cooling fluid and directing the cooling fluid into the distribution plenum, through the distribution passage and the discharge passage, and into the airgap,
    wherein the discharge passage is angled relative to the radial direction.

15. The electric machine of claim 14, wherein the discharge passage is curvilinear.

16. An electric machine defining an axial direction, a radial direction, and a circumferential direction, the electric machine comprising:

a shaft rotating about the axial direction;

a rotor assembly mechanically coupled to the shaft;

a stator assembly surrounding the rotor assembly and being spaced apart from the rotor assembly along the radial direction to define an airgap therebetween, the stator assembly further comprising a lamination stack defining a distribution passage that extends through the lamination stack from an axial end face of the lamination stack, the lamination stack further defining a discharge passage that extends between the distribution passage and the airgap;

a cooling manifold positioned at the axial end face of the lamination stack and defining a distribution plenum in fluid communication with the distribution passage, wherein the cooling manifold is configured for receiving a cooling fluid and directing the cooling fluid into the distribution plenum, through the distribution passage and the discharge passage, and into the airgap;

a cooling jacket positioned around an outer radial surface of the stator assembly and defining a cooling channel; and a cooling fluid supply in fluid communication with the cooling channel of the cooling jacket to provide a secondary cooling fluid through the cooling jacket, wherein the cooling manifold is formed at least in part by the cooling jacket.

17. An airgap cooling system for an electric machine, the electric machine comprising a rotor assembly rotatably mounted within a stator assembly and defining an airgap therebetween, wherein the stator assembly comprises a lamination stack, the airgap cooling system comprising:

a plurality of distribution passages that extend through the lamination stack from an axial end face of the lamination stack;

a plurality of discharge passages that extend between the plurality of distribution passages and the airgap;

a cooling manifold positioned at an axial end face of the lamination stack and defining an annular distribution plenum in fluid communication with the plurality of distribution passages, wherein the cooling manifold is configured for receiving a cooling fluid and directing the cooling fluid into the distribution plenum, through the plurality of distribution passages and the plurality of discharge passages, and into the airgap, wherein the cooling manifold is configured for receiving the cooling fluid from a cooling fluid supply that is fluidly coupled to the cooling manifold, wherein the cooling fluid supply comprises a compressor bleed source of a gas turbine engine.

18. The airgap cooling system of claim 17, wherein the axial end face is a first axial end face and the plurality of distribution passages extend through the lamination stack to a second axial end face of the lamination stack, the airgap cooling system further comprising:

an auxiliary cooling manifold positioned at the second axial end face of the lamination stack and defining an auxiliary annular distribution plenum in fluid communication with the plurality of distribution passages.

19. The airgap cooling system of claim 17, wherein the plurality of distribution passages extends through the lamination stack parallel to an axial direction and the plurality of discharge passages extend parallel to a radial direction.

* * * * *